Dec. 7, 1926.
V. LANCIA
1,609,951
VEHICLE BRAKE
Filed June 29, 1925    2 Sheets-Sheet 2
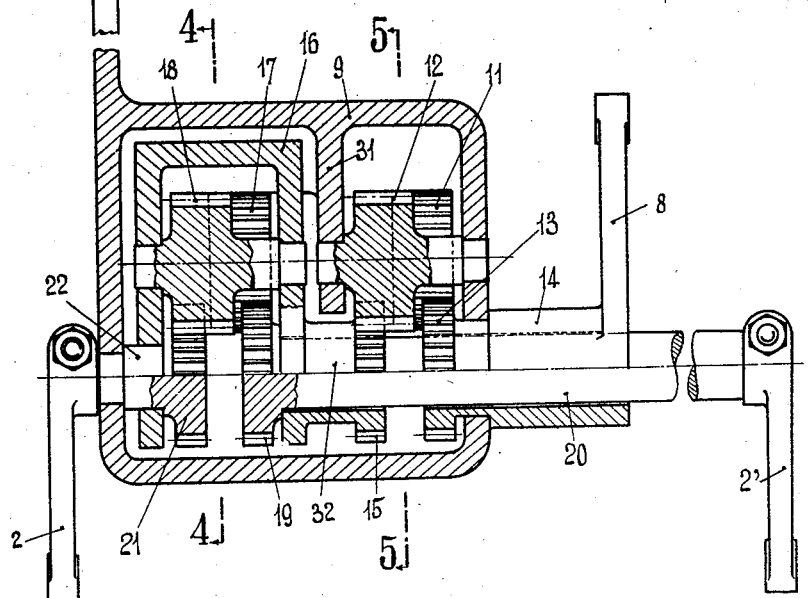
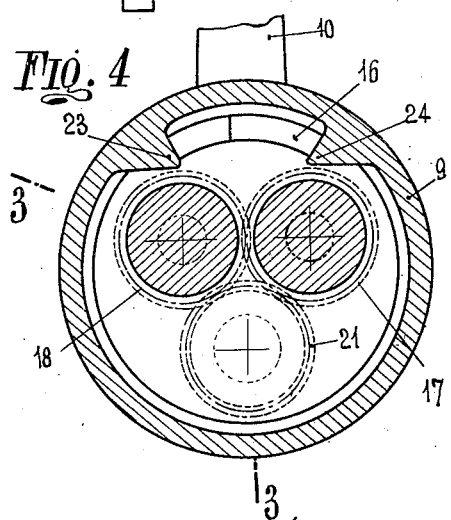
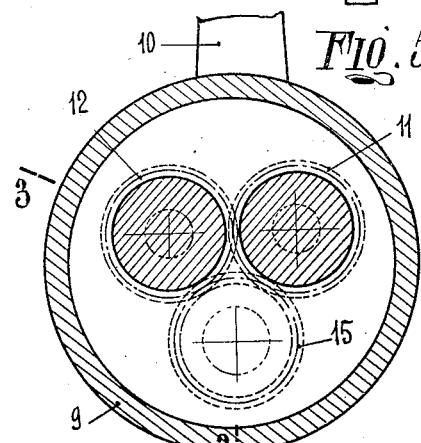
Inventor
V. Lancia
by Langner, Parry, Card + Langner
Attys.

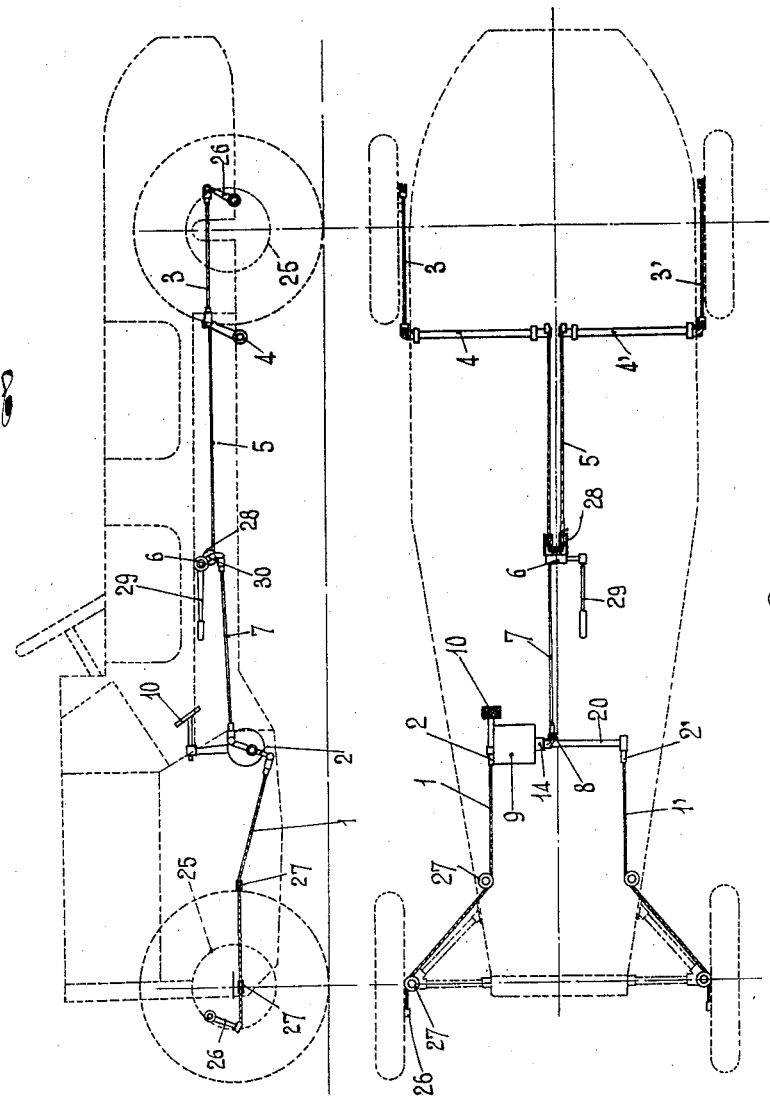

Patented Dec. 7, 1926.

1,609,951

UNITED STATES PATENT OFFICE.

VINCENZO LANCIA, OF TURIN, ITALY.

VEHICLE BRAKE.

Application filed June 29, 1925, Serial No. 40,384, and in Italy June 30, 1924.

The present invention relates to gears for actuation of brakes in vehicles having brakes on their four wheels, and it has for its object an actuating gear by means of which a differential balanced action is obtained in respect of associate wheels of the front wheel pair and of the rear wheel pair, as well as in respect of the front wheel brake set and of the rear wheel brake set.

On the annexed drawing is shown by way of example an embodiment of the present invention and Figure 1 is a diagrammatical elevation of a vehicle provided with the present gear, said vehicle being shown by its outline in dotted lines;

Figure 2 is a plan view of the same;

Figure 3 is a central section on an enlarged scale of the actuating gear on line 3—3 of Figures 4 and 5;

Figure 4 is a transverse section on line 4—4 of Figure 3 and Figure 5 is a transverse section of the same gear on line 5—5 of Figure 3.

As shown in Figures 1 and 2, the wheel brake mechanism for each wheel is assumed to be enclosed within the brake drum 25 as customary, and to be actuated by an arm 26.

The brake actuating arms 26 of the front wheels are actuated by cords 1—1' passing on loose grooved pulleys 27 and connected to arms 2—2' hereinafter described, while the arms 26 of the rear wheel brakes are actuated by a cord 5 which passes on loose pulleys 28 mounted on an actuating member 6 as hereinafter described, said cord 5 and cooperating pulleys 28 being adapted to produce a balanced operation of the rear wheel brakes as well known.

Said member 6 is provided with a hand actuated lever 29 and it is further connected by means of arm 30 with a tie member 7 connected with arm 8 solid with a hollow spindle 14 of the gear hereinafter described (see Figure 3).

The differential gear for the balanced actuation of the vehicle brakes is hereinafter described; said gear is hereinafter referred to in its whole by reference 9 and it is rotatably mounted on the vehicle frame by means not shown owing to the diagrammatic character of Figures 1 and 2.

Said gear comprises a box 9 having an operating pedal 10 solid with it and it comprises an inward projecting partition 31 providing two compartments.

In one of said compartments are journalled pinions 11 and 12 shifted longitudinally with respect to each other and meshing with each other on a portion of their width; further said pinion 11 is in mesh with a pinion 13 solid with the sleeve 14 rotatable in the box 9 and having said arm 8 integral with it, while pinion 12 meshes with pinion 15 which is loose on a central spindle 20 solid with arm 2' and loose in sleeve 14.

The pinion 15 is solid with a collar 32 which carries a bridge 16 having one leg loose on a spindle 22 rotatable in box 9 and carrying an arm 2 and a pinion 21, and in said bridge are pivoted two pinions 17 and 18 meshing with each other on a portion of their width, the pinion 18 meshing further with pinion 21 and the pinion 17 meshing with a pinion 19 solid with spindle 20.

The said bridge 16 is enclosed with lost motion between two internal projections 23 and 24 of the box 9 (see Figures 4 and 5) and therefore on said box 9 being rotated around axis of spindles 20 and 22 it drives the said bridge 16 after said box has been moved through a certain angle.

In operation when the pedal 10 is actuated said box 9 is rotated around axis of spindles 20 and 22, and therefore the axis of pinions 11 and 12 is caused to rotate and said intermeshing pinions drive both pinion 13 solid with arm 8 and pinion 15 which in turn moves the bridge 16 and causes a revolution of axis of pinion 17—18, the last named pinions driving pinions 21 and 19 which actuate spindle 22 with arm 2 and spindle 20 with arm 2' respectively.

On the rear brakes being applied in a balanced manner owing to their actuation through the cord 5 and loose pulleys 28, member 6 and arms 28 and 8, the arm 8 is stopped and therefore pinion 11 rolls on pinion 13 thus driving pinions 12 and 15, and therefore the bridge 16 is caused to rotate in the same direction as imparted to box 9 by the actuation of pedal 10.

Then the pinions 17 and 18 loose in said bridge drive in a differential manner the pinions 21 and 19 and respective spindles 22 and 20 and arms 2 and 2', to apply the front brakes in a balanced manner.

The actuation imparted to the pedal 10 is thus transmitted in a differential manner to arm 8 and bridge 16 and then to arms 2—2', and thus a balanced operation of the brakes on the front wheels is obtained.

In the event the parts transmitting actuation to rear brakes be broken, the described operation of pinions 11 and 13 would fail, but after a certain lost motion depending upon the space between bridge 16 and tooth 24 of box 9, this tooth under the operation of the pedal 10 drives directly the bridge 16 and thus applies differentially the front brakes.

On the contrary in the event one of the members operating the front brakes is broken, the bridge 16, on the box 9 being actuated, is caused to contact with tooth 23 of box 9 through the engagement of the differential gear pinions and said abutting bridge 16 and tooth 23 act to stop said bridge and to permit for the differential operation of pinions 13—11—12—15 to apply the rear brakes.

As above described the action of the pedal 10 operates the brakes on the four wheels of the car while the hand lever 29 is connected with member 6 with lost motion to permit for a free respective rotation of member 6 under the operation of pedal 10 and the above described operation, while the manipulation of said hand lever provides for the actuation of the rear brakes.

The described gear ensures a safe differential operation of four wheel brakes under any circumstance.

It is to be understood that the present invention is only defined by appended claims, the described construction being merely submitted by way of example as a possible embodiment of the present invention.

What I claim as my invention and desire to secure by United States Letters Patent is:—

1. In a four wheel brake control, an actuating member under action of the operator and rotatably supported along a transverse axis in the vehicle frame, pivoted arms concentric with said actuating member and each connected with the brake gear of one of a pair of vehicle wheels, a member differentially coupling said arms with each other, a third arm connected with the brake gear of the two wheels of the other pair, and means for differentially coupling said third arm with said differential member.

2. In a four wheel brake control, an actuating member under action of the operator and rotatably suppirted along a transverse axis in the vehicle frame, pivoted arms concentric with said actuating member and each connected with the brake gear of one of a pair of vehicle wheels, pinions each connected with one of said arms, pinions meshing with each other and each with one of said arm pinions, a carrier in which said intermeshing pinions are pivoted, a pinion solid with said carrier, a third arm mounted to rotate and concentric with said actuating member and connected with the brake gear of the other pair of wheels, a pinion connected with said third arm, two pinions meshing with each other and each with one of said pinions connected respectively with said carrier and third arm, said last named intermeshing pinions being pivoted in said actuating member.

3. In a four wheel brake control, an actuating member under action of the operator and rotatably supported along a transverse axis in the vehicle frame, pivoted arms concentric with said actuating member and each connected with the brake gear of one of a pair of vehicle wheels, pinions each connected with one of said arms, pinions meshing with each other and each with one of said arm pinions, a carrier in which said intermediate pinions are pivoted, a pinion solid with said carrier, a third arm mounted to rotate and concentric with said actuating member and connected with the brake gear of the other pair of wheels, a pinion connected with said third arm, two pinions meshing with each other and each with one of said pinions connected respectively with said carrier and third arm, said last named intermeshing pinions being pivoted in said actuating member, and means for engaging said actuating member with said carrier with lost motion.

4. In a four wheel brake control, an actuating member under action of the operator and rotatably supported along a transverse axis in the vehicle frame, pivoted arms concentric with said actuating member and each connected with the brake gear of one of a pair of vehicle wheels, pinions each connected with one of said arms, pinions meshing with each other and each with one of said arm pinions, a carrier in which said intermeshing pinions are pivoted, a pinion solid with said carrier, a third arm mounted to rotate and concentric with said actuating member, a cord loosely engaged intermediate its ends with said arm, said cord being connected with the brake gears of the wheels of the other pair, a pinion connected with said third arm, and two pinions meshing with each other and each with one of said pinions connected respectively with said carrier and third arm, said last named intermeshing pinions being pivoted in said actuating member.

5. In a four wheel brake control, a box pivoted around a transverse axis in the vehicle frame, arms each connected with the brake gear of one of a pair of vehicle wheels, said arms being pivoted concentrically with said box, a member differentially coupling said arms, a third arm connected with the brake gear of the other pair of wheels, and means for differentially coupling said third arm with said differential member, said differential member and means being enclosed in said box, and means under action of the operator for driving said box in rotation around its pivoting means.

6. In a four wheel brake control a box pivoted around a transverse axis in the vehicle frame, arms pivoted concentric with said box and each connected with the brake gear of one of a pair of vehicle wheels, pinoins each connected with one of said arms, pinions meshing with each other and each with one of said arm pinions, a carrier within said box and in which said intermeshing pinions are pivoted, a pinion solid with said carrier, a third arm pivoted concentric with said box and connected with said third arm, two pinions meshing with each other and each with one of said pinions connected respectively with said carrier and said third arm, said intermeshing pinions being pivoted in parts of said box, and means solid with said box and under action of the operator for driving said box in rotation around its pivoting means.

In testimony whereof I have signed my name to this specification.

VINCENZO LANCIA.